US012784619B1

(12) United States Patent
Joseph et al.

(10) Patent No.: US 12,784,619 B1
(45) Date of Patent: Nov. 3, 2026

(54) FAN EFFECT SYSTEM

(71) Applicant: Disney Enterprises, Inc., Burbank, CA (US)

(72) Inventors: Daniel Joseph, Windermere, FL (US); Jessica Klouda, Winter Garden, FL (US); Jason Monahan, Celebration, FL (US); Miles Maline, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 19/263,323

(22) Filed: Jul. 8, 2025

(51) Int. Cl.
*G09F 19/08* (2006.01)
*A63H 3/06* (2006.01)
*F04D 27/00* (2006.01)
*F21S 10/04* (2006.01)

(52) U.S. Cl.
CPC ............... *G09F 19/08* (2013.01); *A63H 3/06* (2013.01); *F04D 27/004* (2013.01); *F21S 10/04* (2013.01)

(58) Field of Classification Search
CPC .... G09F 19/08; G09F 15/0025; G09F 19/008; G09F 19/00; A63H 3/06; A63H 2027/1033; A63H 27/10; F04D 25/084; F04D 25/166
See application file for complete search history.

(56) References Cited

U.S. PATENT DOCUMENTS 4,920,674 A * 5/1990 Shaeffer ................. A63H 27/10 116/210
5,051,673 A * 9/1991 Goodwin ............. A61G 7/0513 5/713
5,145,446 A * 9/1992 Kuo ......................... A63H 5/04 446/485
5,293,707 A * 3/1994 Shaeffer .................. G09F 23/14 40/214
6,155,837 A * 12/2000 Korneliussen ........... G09B 9/00 40/406
6,186,857 B1 * 2/2001 Gazit .................. G09F 15/0025 40/406
6,428,185 B1 * 8/2002 Lin ........................... F21V 1/06 362/253
6,955,440 B2 * 10/2005 Niskanen .............. F21V 29/673 362/396
7,300,179 B1 * 11/2007 LaDuke .................. F21V 5/043 362/244
7,686,471 B2 * 3/2010 Reichow ................. F24C 7/004 362/161
9,579,587 B1 * 2/2017 Chen .................... A63H 33/009
(Continued)

OTHER PUBLICATIONS

U.S. Appl. No. 19/058,422, filed Feb. 20, 2025, Disney Enterprises, Inc.

*Primary Examiner* — Eldon T Brockman
(74) *Attorney, Agent, or Firm* — Foley & Lardner LLP

(57) ABSTRACT

A fan effect system includes a fan system including a fan in communication with a plurality of fin blades partially disposed to receive a fan airflow from the fan. The fan system also includes a nozzle coupled to the plurality of fin blades opposite the fan. The nozzle includes an opening. The fan effect system includes a fabric material including a translucent or transparent surface. The fabric material is coupled to a portion of the fan system. Air flows from the fan through the plurality of fin blades and is directed by the opening of the nozzle to the fabric material to cause the fabric material to oscillate.

20 Claims, 11 Drawing Sheets

(56) References Cited

U.S. PATENT DOCUMENTS

| | | | | |
|---|---|---|---|---|
| 11,732,897 B2 * | 8/2023 | Zhou | F24C 15/06 392/348 |
| 2002/0080601 A1 * | 6/2002 | Meltzer | F24C 7/004 362/811 |
| 2003/0053305 A1 * | 3/2003 | Lin | F21V 29/60 362/208 |
| 2006/0291217 A1 * | 12/2006 | Vanderschuit | A63H 33/22 362/363 |
| 2008/0112154 A1 * | 5/2008 | Reichow | F21S 10/04 362/96 |
| 2022/0349550 A1 * | 11/2022 | Mitchell | F21V 3/049 |
| 2024/0350930 A1 * | 10/2024 | Gu | F04D 27/004 |

* cited by examiner

FAN EFFECT SYSTEM

TECHNICAL FIELD

The present disclosure relates generally to a fan effect system. Particularly, the use of a fan system and a fabric material to achieve dynamic movement of the fabric material.

BACKGROUND

Fire effects and atmospheric effects (e.g., smoke effects) are often needed for attractions, theatrics, events, etc. However, using real fire, smoke, etc. may have safety and cost implications. Additionally, real fire may be difficult to control, for example, control a shape or color of the fire. Conventional fan effect systems to create fire effects utilize silk and LED lights and are limited in extension capabilities of the silk and customizability of effects on the silk with the LED lights. This may result in an unrealistic appearance of the effect with conventional fan effect systems.

SUMMARY

Various embodiments relate to a fan effect system. The fan effect system includes a fan system including a fan in communication with a plurality of fin blades partially disposed to receive a fan airflow from the fan. The fan system also includes a nozzle coupled to the plurality of fin blades opposite the fan. The nozzle includes an opening. The fan effect system includes a fabric material including a translucent or transparent surface. The fabric material is coupled to a portion of the fan system. Air flows from the fan through the plurality of fin blades and is directed by the opening of the nozzle to the fabric material to cause the fabric material to oscillate.

Various embodiments relate to a fan effect system. The fan effect system includes a fan system including a fan and a fabric material including a translucent or transparent surface. The fabric material is coupled to a portion of the fan system. The fan system is configured to generate airflow to cause the fabric material to oscillate. The fan effect system also includes a control unit including one or more processors communicably coupled to memory. The control unit is communicatively coupled to the fan system and configured to control a speed of the fan to control the oscillations of the fabric material.

Various embodiments relate to a fan system for a fan effect system. The fan system includes a fan, a plurality of fin blades partially disposed within the fan and in communication with the fan, a fan grate coupled to the fan, and a nozzle coupled to the plurality of fin blades. The nozzle including an opening. Air flows from the fan through the plurality of fin blades and out of the fan system by the opening of the nozzle. A fabric material manufactured from a synthetic material is coupled to a portion of the fan system. The air directed out by the nozzle causes the fabric material to oscillate.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
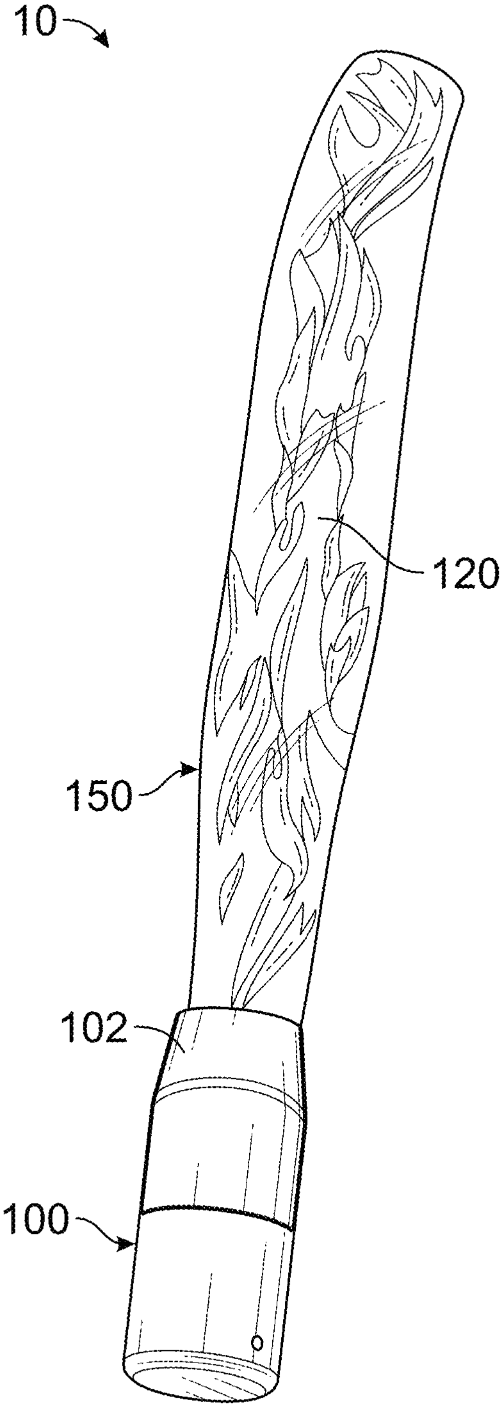
FIG. 1 is an illustration of a fan effect system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Described herein are systems and methods for the use of a fan effect system. The fan effect system includes a fan system and a fabric material to efficiently deploy the fabric material and achieve a number of effects. The fan system includes a brushless fan that can achieve higher speeds in comparison to fans used in conventional fan effect systems. As a result, the fabric material can be almost instantaneously deployed and deployed at higher heights. Additionally, the high power and speed from the fan system allows for the fan effect system to be deployed at a number of angles and/or positions (e.g., horizontally, from a moving vehicle, from a costume, etc.). The fabric material is coupled to a portion of the fan system, such that air from the brushless fan is directed by a nozzle to the fabric material to cause the fabric material to deploy. The fabric material is manufactured from synthetic material and has a translucent or transparent surface providing a surface for projection. As described herein, a visual effect, such as by video projection and/or interaction with a lighting system, can be displayed onto the surface of the fabric material. Due to the configuration of the fan system and the fabric material, the fan effect system can be used for various effects such as fire effects, smoke effects, appearance of characters (e.g., ghastly character), laser effects, etc.

FIG. 1 depicts a fan effect system 10 including a fan system 100 and a fabric material 150 coupled to the fan system 100, according to an exemplary embodiment. The fan system 100 and the fabric material 150 allow for improved control and transparency for effects in attractions and events. The fan system 100 and the fabric material 150 may be used to emulate a number of effects and movements, such as fire effects and atmospheric effects. Additionally, the fan system 100 and the fabric material 150 may be used to create dynamic motion. The fan system 100 and the fabric material 150 may be arranged and coupled to a variety of surfaces. In various embodiments, the fan system 100 and the fabric material 150 may be added to an object or surface (i.e., moving or stationary), such as a statue, a prop, a robot, an animatronic figure, a vehicle (e.g., a parade float), etc. In various embodiments, the fan system 100 and the fabric material 150 may be coupled to clothing (e.g., a character costume) or may be held by a human.

With general reference to the fan system and the fabric material, in some implementations, the fan system is a brushless fan configured to achieve high speed. The high speed allows for the fan system and the fabric material to be positioned, and the fabric material to deploy out, at any desired angle, for example, horizontally with respect to a ground. The fan system can be controlled, such that the fabric material can produce a sequence of movements (e.g., oscillations). The movements can be used to emulate a desired effect or motion. For example, the fan system can be controlled for the fabric material to move in a motion similar to fire. The fabric material is substantially transparent or translucent, providing a bright projection surface. As a result, the fabric material can display a visual effect, such as by video projection and/or interaction with a lighting system (e.g., lasers), in addition to conventional methods such as LEDs. An example of projecting on a moving fabric material is described in U.S. patent application Ser. No. 19/058,422, filed on Feb. 20, 2025.

While various visual effects can be displayed on the fabric materials, the fan effect system 10 of FIG. 1 depicts a fire effect. As shown in FIG. 1, the fan system 100 is powered, such that the fabric material 150 is deployed (e.g., extended outwardly) from the fan system 100 due to air blowing from the fan system 100. The fabric material 150 is coupled to the fan system 100, such as by an adhesive material, shown as tape 102, one or more fasteners, capture of the fabric material 150 between two components of the fan system 100, or the like. In various embodiments, the fan system 100 may include extrusions (e.g., grooves, ridges, sections) and the fabric material 150 is positioned over the extrusions. In such embodiments, the fabric material 150 may be coupled to the fan system 100 by an additional component positioned over the fabric material 150 to lock the fabric material 150 in place. In various embodiments, the fabric material 150 is selectively coupled to the fan system 100, such as to allow for replacement when the fabric material 150 is damaged. The fabric material 150 may be coupled to a center of an output nozzle of the fan system 100. Such positioning of the fabric material 150 allows for airflow from the fan system 100 to flow on both sides of the fabric material 150. When the fan system 100 is powered, the fabric material 150 interacts with an airflow generated by the fan system 100. In some implementations, as shown in FIG. 1, the fabric material 150 deploys from a fixation position, where the fabric material 150 is coupled, in a direction of airflow from the fan system 100. As described herein, the airflow from the fan system 100 can be laminar and controlled, allowing the fabric material 150 to extend and move in a controlled manner.

The fabric material 150 may be stowed in a receptacle (e.g., a container, a holder, etc.) adjacent the fan system 100. In such embodiments, the fabric material 150 may be configured such that the fabric material 150 falls into the receptable after use of the fan effect system 10 (e.g., when the fan system 100 is not powered on). For example, the fabric material 150 may be coupled to a component (e.g., a wire, a series of wire, a roller, etc.) that pulls the fabric material 150 into the receptable when the fan effect system 10 is not in use. In various embodiments, the receptable may be coupled to the fan system 100. In other embodiments, the fabric material 150 may include a roller (e.g., automated, manual, etc.) that retracts the fabric material 150 after use of the fan effect system 10. In such embodiments, after the fan system 100 is powered on, the roller may uncoil the fabric material 150 for deployment. This process may be automated by use of the automated roller, such that the automated roller includes a roller motor that automatically uncoils the fabric material 150 when the fan system 100 is powered on and retracts the fabric material 150 when the fan system 100 is powered off.

Figure 2:
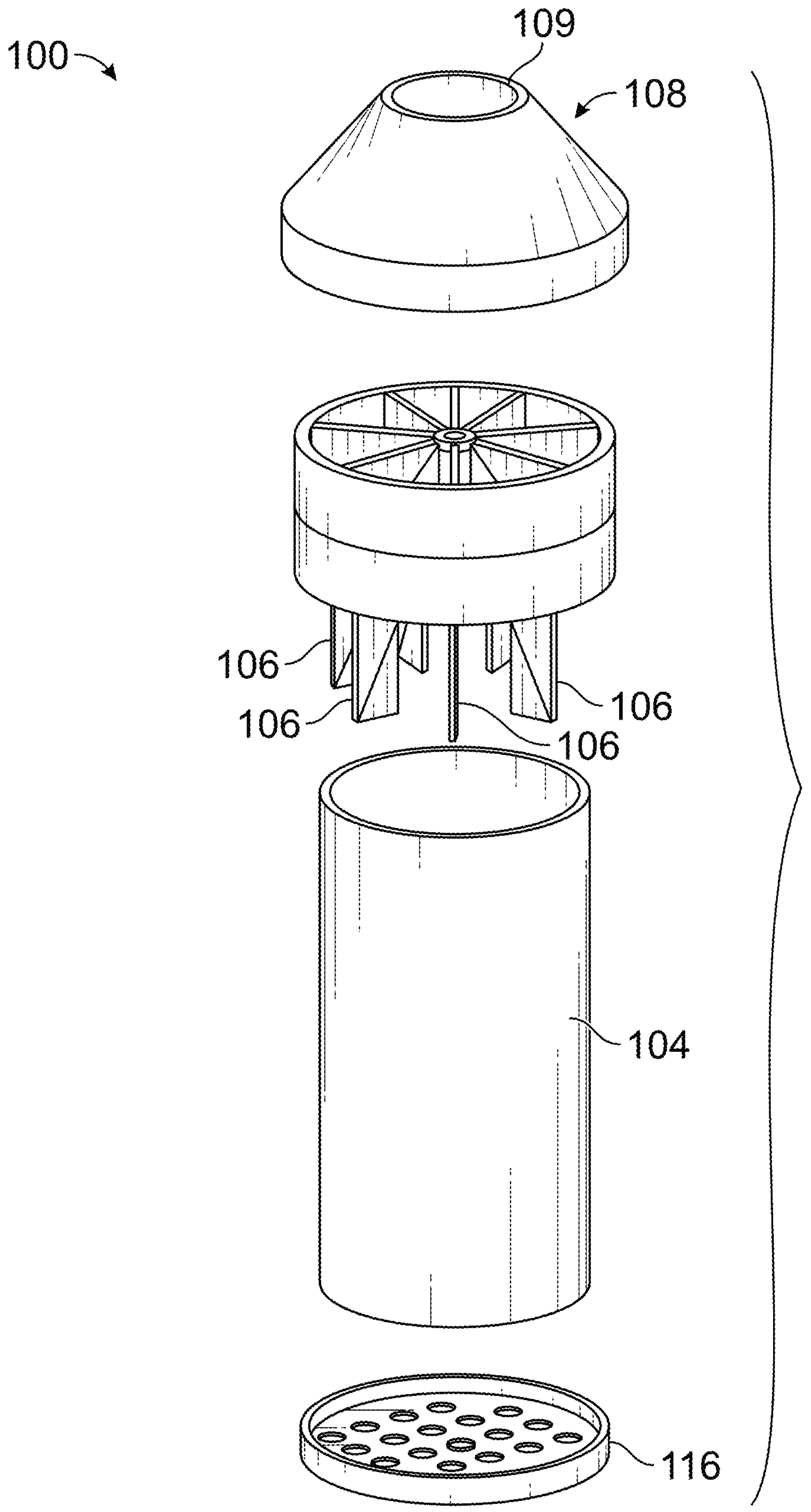
FIG. 2 is an illustration of an exploded view of a fan system, according to an example embodiment.
Figure 3:
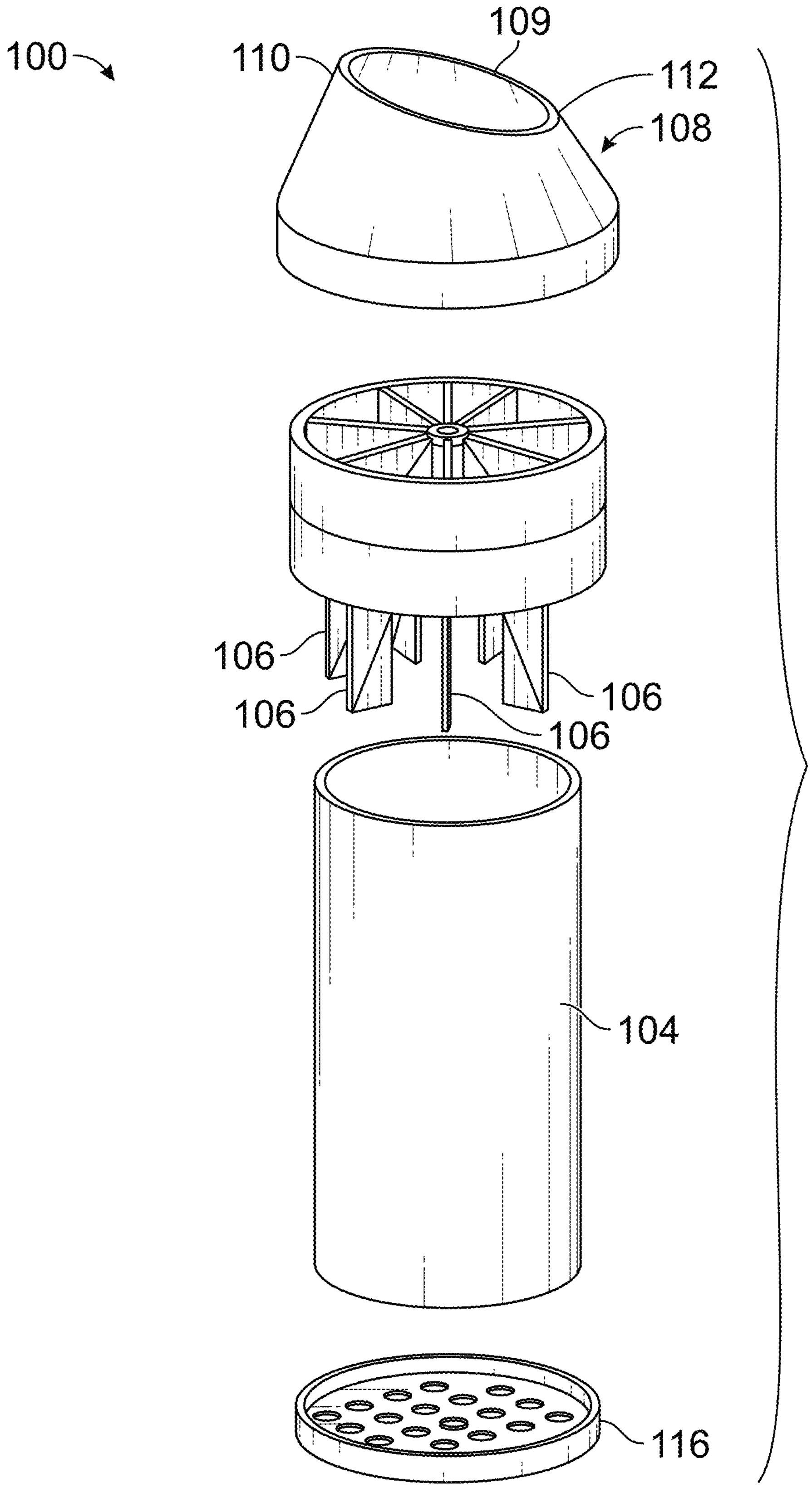
FIG. 3 is an illustration of an exploded view of a fan system, according to an example embodiment.

FIGS. 2 and 3 show exploded views of the fan system 100, according to exemplary embodiments. As shown in FIGS. 2 and 3, the fan system 100 includes a fan 104. In some implementations, the fan 104 is a brushless fan (e.g., a three-phase brushless fan). The fan 104 may include a brushless motor to enable a higher rotational speed (e.g., 10,000-100,000 revolutions per minute) and increased wind speed when compared to brushed motors. For example, the fan 104 may have a wind speed of up to 60 meters per second. Previous systems with brushed fans and motors generally have less power and may result in the fabric material 150 not being able to fully extend. The fan 104, as described herein, is a high power, for example a ducted fan. For example, in various embodiments, the fan 104 may draw up to 30 amps and have a maximum airflow of 200 cubic feet per minute. The airflow rate of the fan 104 allows for the fan system 100, and the fabric material 150 to deploy quickly (e.g., substantially instantaneously) and at a number of angles. For example, the fan effect system 10 including the fan system 100 and the fabric material 150 may be deployed horizontally with respect to a surface. In another example, the airflow is outputted and deploys the fabric material 150 at an angle relative to a direction of the fan system 100, such that the airflow from the fan system 100 to the fabric material 150 is nonlinear. The configuration of the fan 104 allows for velocity control, which aids in adjusting movement of the fabric material 150, as described herein. In various embodiments, the fan 104 is a three-phase brushless fan, resulting in increased efficiency and control of the speed of the fan 104.

The fan system 100 also includes a plurality of fin blades 106 as shown in FIGS. 2 and 3. The fin blades 106 are partially disposed within the fan system 100 in communication with the fan 104 to direct airflow generated from the fan 104 toward nozzle 108 forming an air outlet. During operation, the fin blades 106 remain stationary relative to the overall fan effect system 10. The fan 104 generates an airflow, such as by rotating a fan blade or sets of blades, that is directed out of the fan system 100 through the nozzle 108 to cause oscillations and movements of the fabric material 150. The plurality of fin blades 106 are positioned between the fan 104 and the nozzle 108 to aid in modifying the airflow from the fan 104 to provide a modified airflow to the nozzle 108. The plurality of fin blades 106 provide smaller air channels for the airflow to from the fan 104 to move through, which reduces turbulence in the airflow from the fan 104 and creates a modified airflow (e.g., a laminar flow of air). In various embodiments, the fan system 100 may include seven fin blades 106. The number of fin blades 106 may influence the airflow to the fabric material 150 and the speed. The number and spacing of the fin blades 106 maybe selected to achieve a desired airflow property.

The fan system 100 includes a nozzle 108 coupled to the plurality of fin blades 106. The nozzle 108 is coupled to the plurality of fin blades 106 opposite the fan 104. The nozzle 108 aids in controlling and directing the airflow generated by the fan 104 and modified by the fin blades 106 to the fabric material 150. The air generated by the fan 104 and directed through the plurality of fin blades 106 is directed by the nozzle 108 to deploy the fabric material 150 as desired. In some implementations, the airflow through the nozzle 108 to the fabric material 150 remains laminar, creating a predictable velocity profile which can be used for animating the fabric material 150. As described herein, the laminar airflow through the nozzle 108 may be a result of the plurality of fin blades 106 modifying the airflow from the fan 104 to create a laminar airflow.

As shown in FIG. 2, in various embodiments, the nozzle 108 may have a frustoconical shape. The nozzle 108 has an opening 109, in which the air from the fan 104 is directed out of. As shown in FIG. 2, in various embodiments, the opening 109 has a circular shape. In other embodiments, the opening 109 may have a rectangular or crescent shape. The nozzle 108 with the frustoconical shape may be used for fan systems 100 that include only one fan 104 and one nozzle 108 coupled to the fabric material 150 to direct the fabric material 150 in a desired direction. The circular shape of the opening 109 of the nozzle 108 ensures that the airflow remains directed to the fabric material 150 to properly extend the fabric material 150 and ensure the fabric material 150 remains extended when the fan system 100 is powered and as the fan system 100 and the fabric material 150 may be moved or along various angles during operation.

Figure 4:
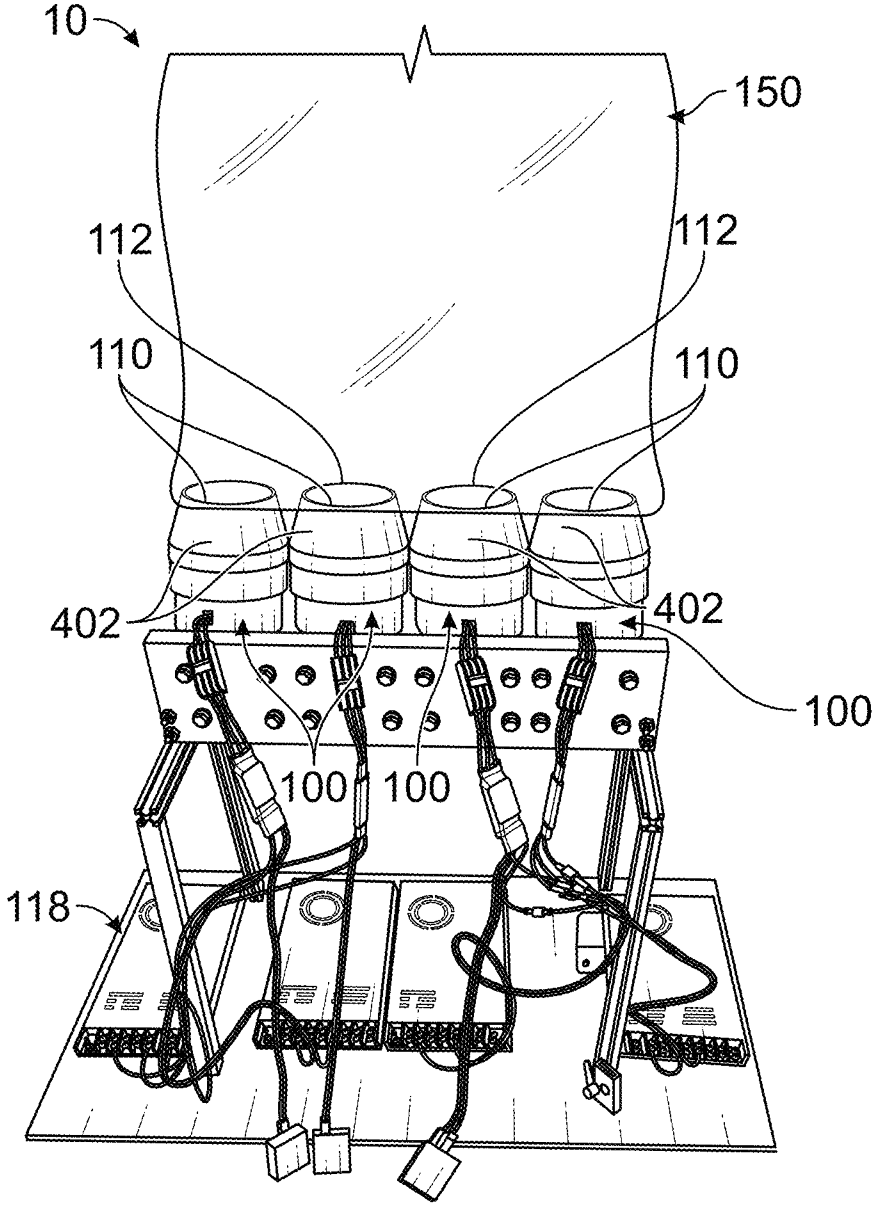
FIG. 4 depicts a fan effect system in a first view, according to an example embodiment.
Figure 5:
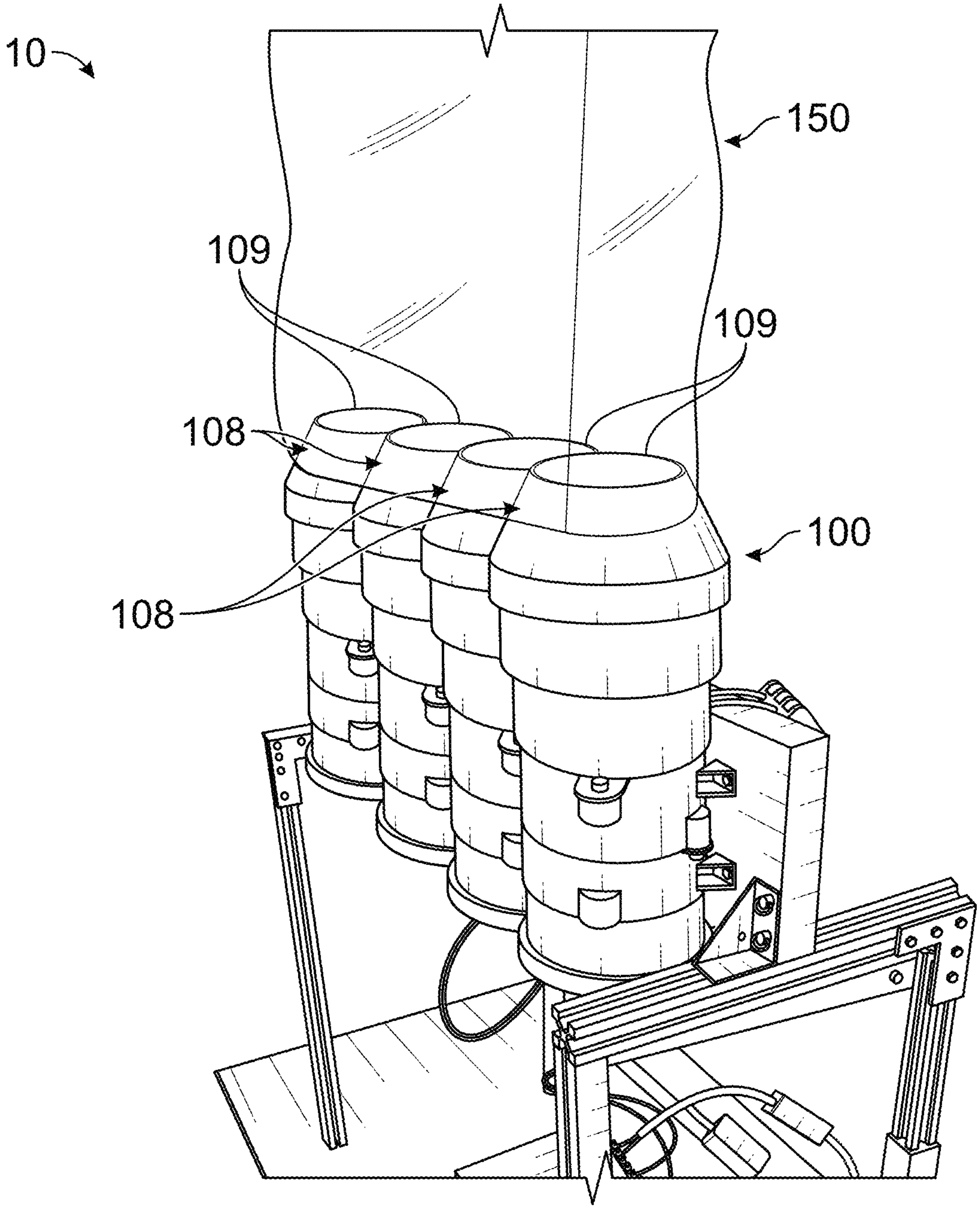
FIG. 5 depicts the fan effect system of FIG. 4 a second view, according to an example embodiment.

In various embodiments, the nozzle 108 may have a frustoconical shape with an angled truncation, as shown in FIG. 3. In such embodiments, the opening 109 of the nozzle 108 has an oval shape due to the angled truncation. The nozzle 108 with the angled truncation may be used for fan effect systems 10 that include more than one fan systems 100 coupled to the fabric material 150 to collectively control the fabric material 150 and ensure the airflow through the nozzle 108 are properly directed to the fabric material 150. FIGS. 4-5 show a fan effect system 10 with a plurality of fan systems 100 to cause oscillation of the fabric material 150. As shown in FIGS. 4-5, the plurality of fan systems 100 are positioned adjacent each other. Each of the fan systems 100 include the fan 104, the plurality of fin blades 106, and the nozzle 108. As shown in FIGS. 3-5, the angled truncation of the nozzle 108 forms an asymmetrical shape for the nozzle 108. The nozzle 108 as shown in FIGS. 3-5, among others, has a high portion 110 and a low portion 112 due to the angled truncation, with the high portion 110 having a greater height from a base of the nozzle 108 than the low portion 112. As shown in FIG. 4, the fabric material 150 is coupled to each of the nozzles 108 with an adhesive material, shown as tape 402. The fan systems 100 and the nozzles 108 thereof are configured such that the fabric material 150 is coupled to the nozzles 108 at the high portion 110 to direct the air towards the fabric material 150.

The fan system 100 includes a guard, grate, etc., shown as a fan grate 116. The fan grate 116 is coupled to a bottom of the fan 104 to protect the fan 104, the fabric material 150 and an external environment of the fan system 100. During use of the fan system 100, the fan grate 116 prevents objects in the external environment from coming in contact with the fan system 100 (e.g., the fan 104, the number of fin blades 106, etc.). For example, when the fan effect system 10 is not in operation (e.g., the fan system 100 is not running and the fabric material 150 is not deployed), the fabric material 150 may be adjacent the fan 104, such that activating the fan could pull the fabric material 150 into the fan 104. The fan grate 116 aids in preventing the fabric material 150 from being pulled (e.g., sucked, moved, etc.) into the fan 104 or damaged by any components of the fan system 100. Further, the fan grate 116 may prevent clothing or environmental materials such as the surface decorations of a float, from being pulled into the fan 104. In some implementations, the fan grate 116 may include a larger surface area than the nozzle 108 or the circumference of the fan 104, such as to reduce the pressure at the fan grate 116, for example when held in proximity to a user (e.g., an animatronic, a human, a guest, a performer, etc.).

The fan effect system 10 includes a controller, control unit, etc., shown as a control unit 118. The control unit 118 includes one or more processors communicably coupled to memory. The fan system 100 is communicatively coupled to (e.g., associated with) the control unit 118 to control operation of the fan system 100. The one or more processors are configured to process and control operations of given processes or data and the memory stores data and information for operation of the fan effect system 10 and/or the fan system 100. In various embodiments, as shown in FIG. 4, among others, at least a portion of the control unit 118 can be coupled to a portion of the fan system 100. The control unit 118 may be communicatively coupled to the fan 104 to control the speed of the fan 104. The speed of the fan 104 directly affects the fabric material 150 and as a result, how the fabric material 150 moves (e.g., oscillates) can be controlled by the control unit 118. The fabric material 150 can move in predictable oscillations based on the speed from the fan system 100 and can be animated in a sequence of movements by changing the speed of the fan 104. In various embodiments, the sequence of movements can be controlled by adjusting the speed of the fan 104 in real-time. In various embodiments, the sequence of movements can be prerecorded such that a predetermined sequence of speeds of the fan 104 is produced by the fan system 100.

The control unit 118 may be configured to interpret data from a user or controls to produce the sequence of speeds of the fan 104. In various embodiments, the control unit 118 is configured to receive an input from the user and process the input to control the speed of the fan 104. For example, the control unit 118 may be used to program a sequence of speeds of the fan 104 (e.g., received by the input) such that the sequence of movements can be produced by the fabric material 150. In various embodiments, the memory may be used to store a number of predetermined sequence of speeds of the fan 104. Additionally, the control unit 118 may be configured to control more than one fan system 100. For example, in embodiments, where the fan effect system 10 includes more than one fan system 100 (e.g., FIGS. 4-5) coupled to the fabric material 150, the control unit 118 may be used to control the speed of the fans 104 of each of the fan system 100.

The fabric material 150 used provides an improved level of transparency and control for the fan effect system 10 when coupled with the fan system 100, as described herein. The fabric material 150 is manufactured from a synthetic material (e.g., synthetic polyester). The use of a synthetic material extends the use of the fabric material 150. Traditional fabric materials utilize natural silk. Long uses of fan systems blowing on natural silk cause the silk to become frayed and damaged, resulting in a decrease or loss of the silk's usability. The synthetic material used for the fabric material 150, as described herein, is less susceptible to fraying and damage in comparison to natural silk. In various embodiments, edges of the fabric material 150 are sealed with heat (e.g., heat cut) to further extend longevity of the fabric material 150. Heat cutting the edges of the fabric material 150 seal the edges and prevent the fabric material 150 from fraying. Advantageously, the fabric material 150 can be easily heat sealed to reduce fraying which differs from natural silk, which is difficult to heat seal and may result in damage to the natural silk. In various embodiments, the edges of the fabric material 150 are straight. In other embodiments, at least one of the edges of the fabric material 150 may be curved (e.g., meandering, nonlinear, etc.). Curved edges may improve a look and movement of the fabric material 150, and an appearance of an effect on the fabric material 150. In various embodiments, the edges may have a thickness different than a center of the fabric material 150.

The fabric material 150 is manufactured from a lighter fabric in comparison to traditional fabric materials. For example, the fabric material 150 may have a density between 3 grams per meter squared ($g/m^2$) and 6 $g/m^2$. Advantageously, the lighter fabric along with the higher power capabilities of the fan system 100, allows for the fabric material 150 to be used to extend/deploy along further distances and heights. For example, in various embodiments, the fabric material 150 may extend up to nine feet. The fabric material 150 has a substantially transparent or translucent surface, which provides a surface for projection. A visual effect may be provided by interacting light with the fabric material 150. For example, LEDs may be positioned to illuminate the fabric material 150, such as coupled to a portion of the fan system 100. For implementations utilizing a transparent or translucent surface of the fabric material 150, the visual effect may comprise a projection on the fabric material 150. As a result, the fan effect system 10 does not require the coupling of LEDs in order to produce a desired visual effect. As described herein, a projection system (e.g., a video projection system, an image projection system) and/or lighting system (e.g., lasers) can be used to provide imagery and effects on the fabric material 150. The fabric material 150 is configured to display, as a visual effect, an image or video from the projection system. The image or video may include characters and/or objects. In various embodiments, the visual effect may be provided with a GOBO (Goes Between Optics) projector. The GOBO projector may be used to project a fixed image (e.g., patterns, shapes, characters, objects, etc.) onto the fabric material 150. Due to the movement of the fabric material 150 due to the fan system 100, as described herein, projection of the fixed image onto the fabric material 150 may provide the visual effect.

In various embodiments, the fabric material 150 may be custom painted or dyed at least one color. The at least one color of the fabric material 150 along with the configuration of the fabric material 150 may be used to produce the visual effect. The visual effect may be from the fabric material 150 alone or from the fabric material 150 when the video projection system and/or lighting system is used.

The visual effect may be combined with movement of the fabric material 150 to provide a more realistic experience. The visual effect may be a representation of a three-dimensional object and the fabric material 150 may be moved by the fan 104 and airflow such that a human observer perceives a three-dimensional visual effect. For example, the image or video may be used to emulate a fire effect 120, as shown in FIG. 1. By projecting a video of a fire, the effect from the fan effect system 10 is more realistic than an effect provided from a conventional silk flame system utilizing LEDs. In various embodiments, the video projection system and/or lighting system may be positioned remotely from the fan effect system 10. In various embodiments, at least a portion of the lighting system may be coupled to the fan effect system 10 (e.g., as described herein with respect to FIGS. 9 and 10). In such embodiments, although the fan effect system 10 and the lighting system may be coupled, the systems may be decoupled such that information on the fan system 100 does not control the video projection and/or the lighting system. In other embodiments, the systems may be communicatively coupled (e.g., by a controller, the control unit 118, etc.). For example, the video projection and/or the lighting system may be configured to power on upon receiving a signal that the fan system 100 is powered on.

Figure 6:
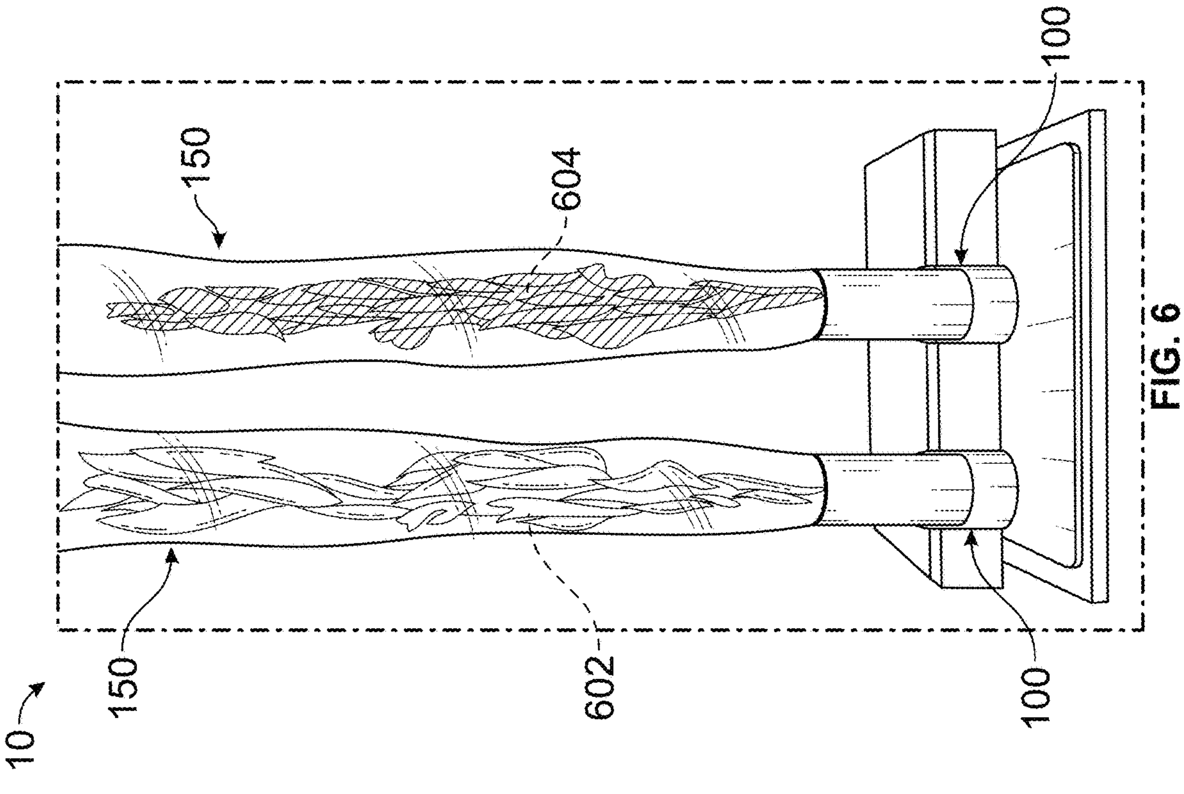
FIG. 6 depicts a fan effect system, according to an example embodiment.

FIG. 6 depicts a fan effect system 10, according to an example embodiment. The fan effect system 10 includes two fan systems 100 and two fabric materials 150. Each of the fan systems 100 are coupled to one of the fabric material 150 and the fan systems 100 are powered allowing for the fabric material 150 on each of the fan systems 100 to deploy and extend outwardly due to airflow from the fans 104. As shown in FIG. 6, a visual effect is displayed on the fabric material 150. The visual effect is a video from a video projection system. In various embodiments, the visual effect is an image from the video projection system. The video projection is configured and utilizes a video of a fire, such that the fan effect system 10 creates the visual effect as a fire effect. The usage of video projection rather than LED lights can create a more realistic effect as the usage of the video projection along with oscillations of the fabric material 150 can provide a more animated and moving effect. Advantageously, the use of video projection for the fan effect system 10 allows for a variety of colors, movements, shapes, and characters to be utilized with the fan effect system 10, which can be difficult or unattainable with only LED lights. In various embodiments, a combination of both video projection and LED lights may be used to further enhance the effect from fan effect system 10.

As shown in FIG. 6, the video projections used for the two fabric materials 150 are different. The movement of the fire in the video projection for the fabric material 150 at position 602 is different than the movement of the fire in the video projection for the fabric material 150 at position 604. In various embodiments, a color of the fire for each of the video projections may also be different. As described herein, the video projection and/or other lighting systems may be decoupled from the fan system 100 and the fabric material 150 allowing for an ease in interchangeability of the video projections. As a result, the fan effect system 10 can easily utilize a number of different videos and effects for the same fan effect system 10 by changing the image or video projected from the video projection system.

Figure 7:
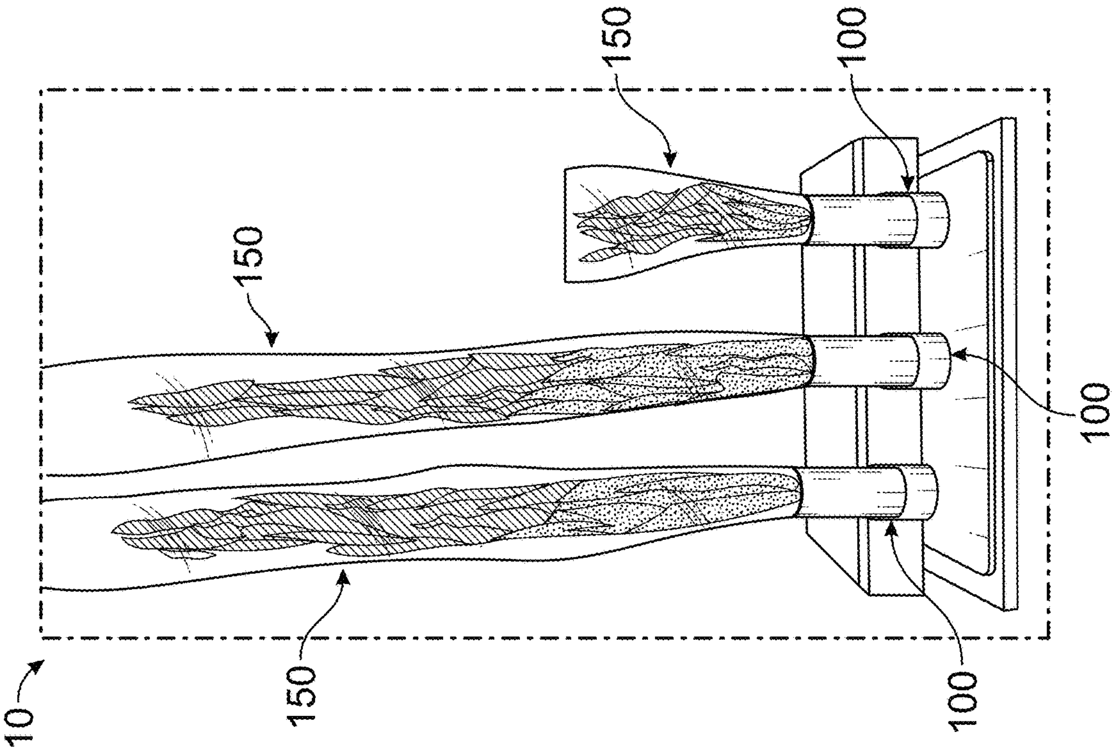
FIG. 7 depicts a fan effect system in a first position, according to an example embodiment.
Figure 8:
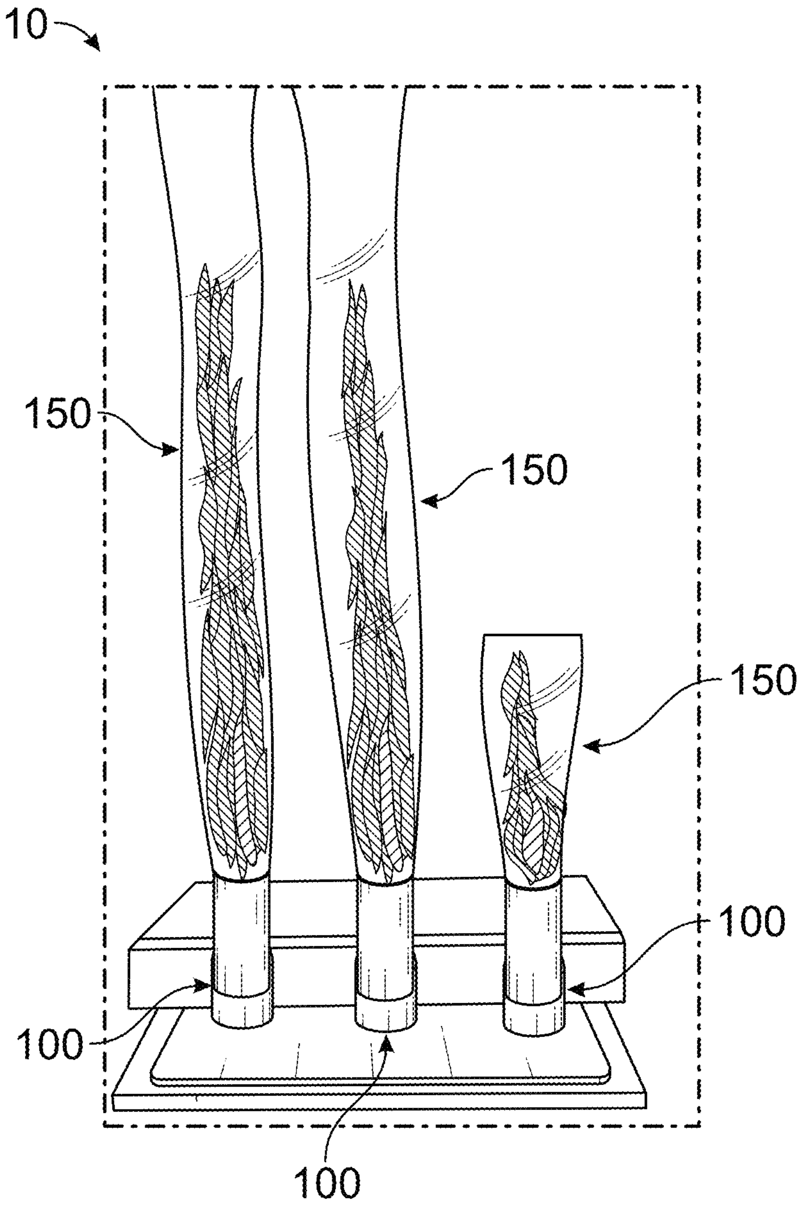
FIG. 8 depicts the fan effect system of FIG. 7 in a second position, according to an example embodiment.

FIGS. 7 and 8 depict a fan effect system 10 in a first position (FIG. 7) and a second position (FIG. 8), according to an example embodiment. The fan effect system 10 includes three fan systems 100 and three fabric materials 150. Each of the fan systems 100 are coupled to one of the fabric materials 150 and the fan systems 100 are powered allowing for the fabric material 150 on each of the fan system 100 to deploy and extend outwardly due to airflow from the fans 104. As shown in FIGS. 7 and 8, a visual effect is displayed on the fabric material 150 from a video projection system, such that the fan effect system 10 creates a fire effect. The visual effect is of a video of fire from the video projection system. In the first position, as shown in FIG. 7, the video for the fire effect created has a color and movement, shown with a pattern of hatches and stippling, different than the video for the fire effect in the second position (FIG. 8), shown with a pattern of hatches. As described herein, the usage of the video projection system decoupled from the fan effect system 10 allows for the video and the image to be interchanged quickly and while the fan effect system 10 remains operating. In various embodiments, the speed of the fans 104 may also be adjusted to further emulate the fire effect as desired. For example, the speed of the fans 104 in the first position may be different or the same as the speed of the fans 104 in the second position.

Figure 9:
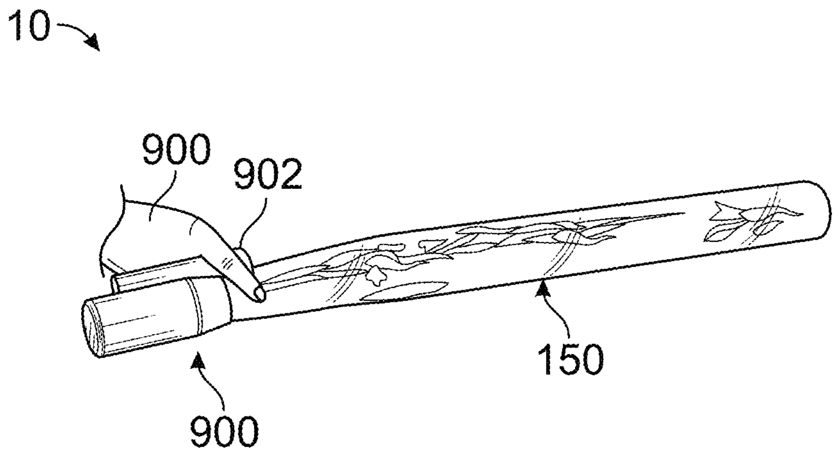
FIG. 9 depicts a fan effect system in a first position, according to an example embodiment.
Figure 10:
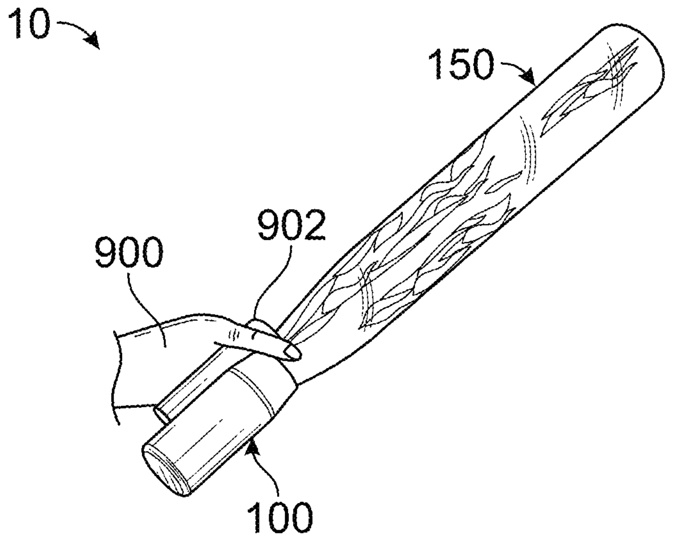
FIG. 10 depicts the fan effect system of FIG. 9 in a second position, according to an example embodiment.

FIGS. 9 and 10 depict a fan effect system 10 in a first position (FIG. 9) and a second position (FIG. 10), according to an example embodiment. The fan effect system 10 includes the fan system 100 and the fabric material 150 coupled to the fan system 100. As shown in FIGS. 9 and 10, the fan effect system 10 is held by a user 900. The user 900 may be an animatronic, a human (e.g., a performer, a guest, etc.), or a fixed object such as a statue or figure. In various embodiments, the fan effect system 10 may be coupled (e.g., positioned, built, etc.) to a clothing or a body part (e.g., wrist, ankle, etc.) of the user 900. As described herein, an angle in which the fan system 100 can deploy the fabric material 150 is adjustable due to the high power of the fan and the light material of the fabric material 150. In the first position, the fan effect system 10 is held by the user 900 in a direction that is substantially horizontal (e.g., angle with respect to a ground is approximately) 0° and in the second position, the fan effect system 10 is held by the user 900 in a diagonal direction (e.g., angle with respect to a ground is approximately) 45°. The user 900 can move the fan effect system 10 (e.g., the fan system 100) during operation and the high power along with the directing of airflow by the nozzle 108 allows for the fabric material 150 to remain properly deployed.

As shown in FIGS. 9 and 10, a lighting system, shown as laser light 902, is also being held by the user 900. Light shown from the laser light 902 is displayed by the fabric material 150 and may be used to create a visual effect for the fan effect system 10. For example, the visual effect may be of a sword effect. As shown in the first position and the second position, the laser light 902 is moved with the fan effect system 10. That is, as the fan effect system 10 is moved to different angles the laser light 902 is being moved for the fabric material 150 to receive the light from the laser light 902. In various embodiments, the laser light 902 is moved by the user 900. In other embodiments, the laser light 902 may be coupled to a portion of the fan effect system 10, such that the laser light 902 moves with the fan effect system 10.

Figure 11:
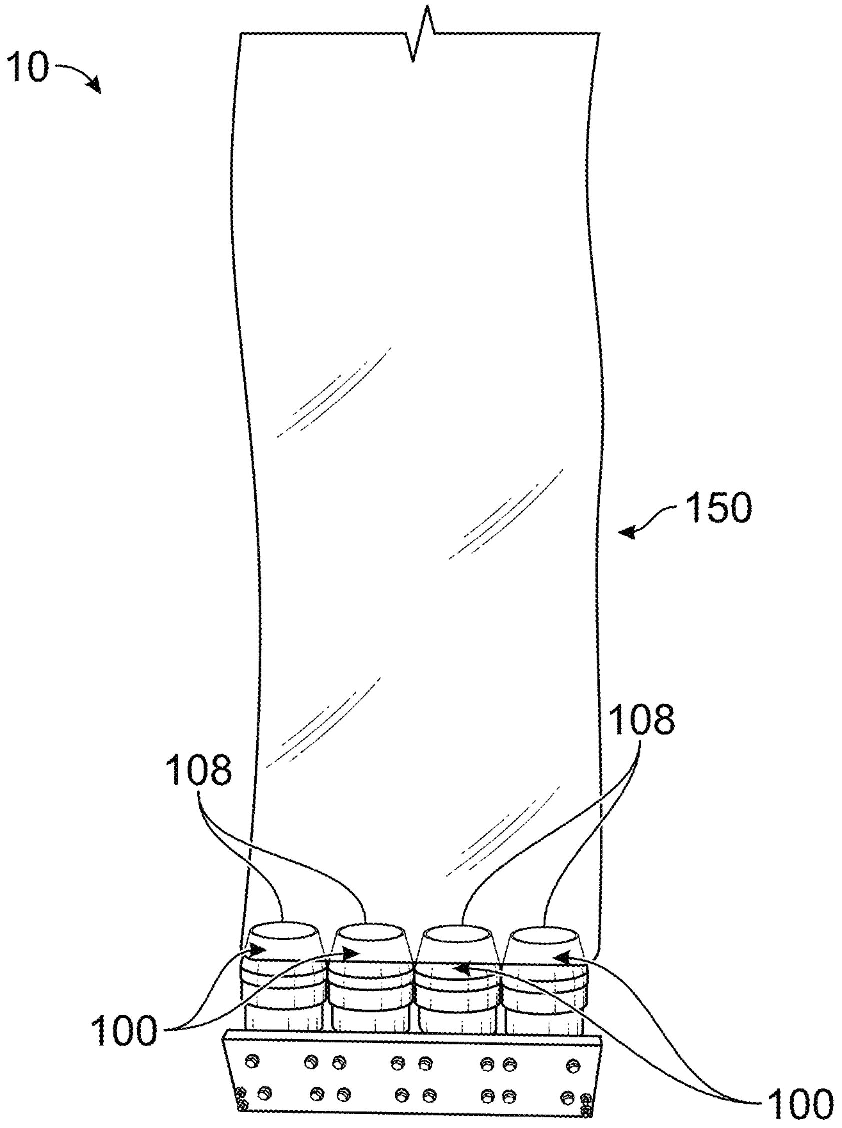
FIG. 11 depicts a fan effect system in a first position, according to an example embodiment.
Figure 12:
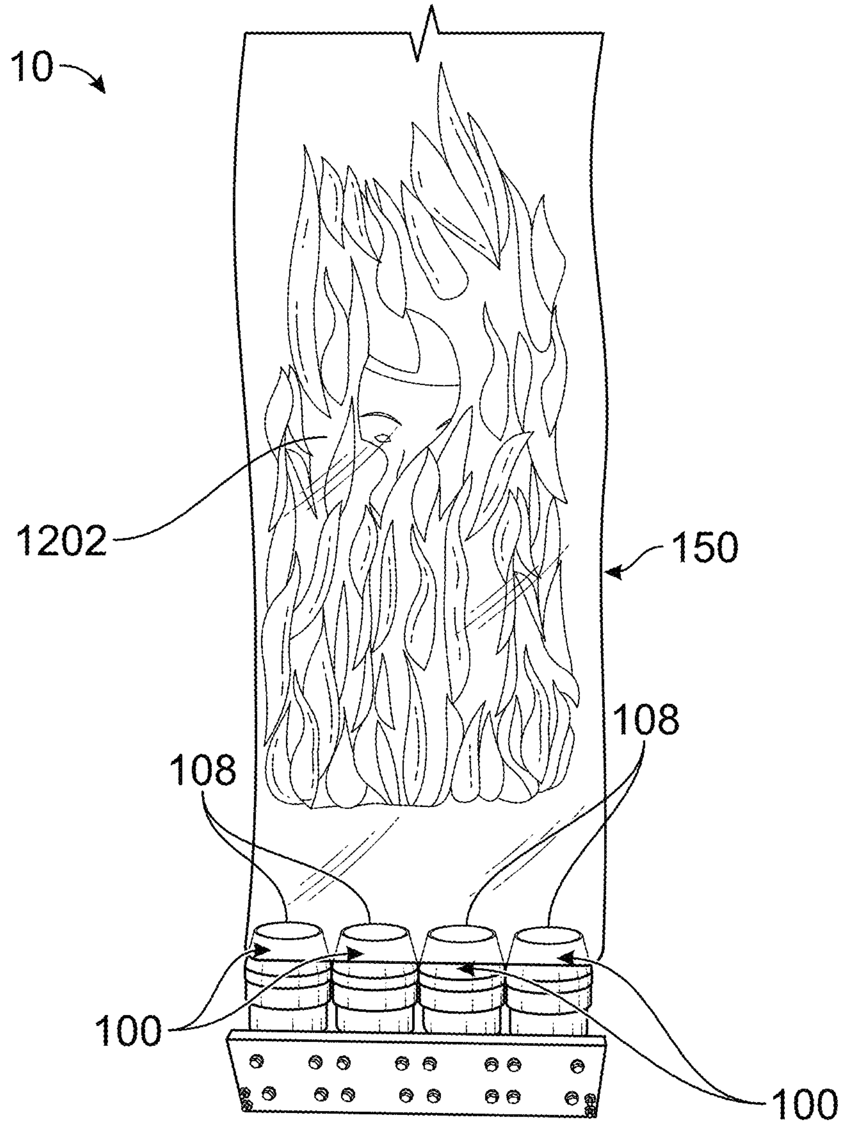
FIG. 12 depicts the fan effect system of FIG. 11 in a second position, according to an example embodiment.
Figure 13:
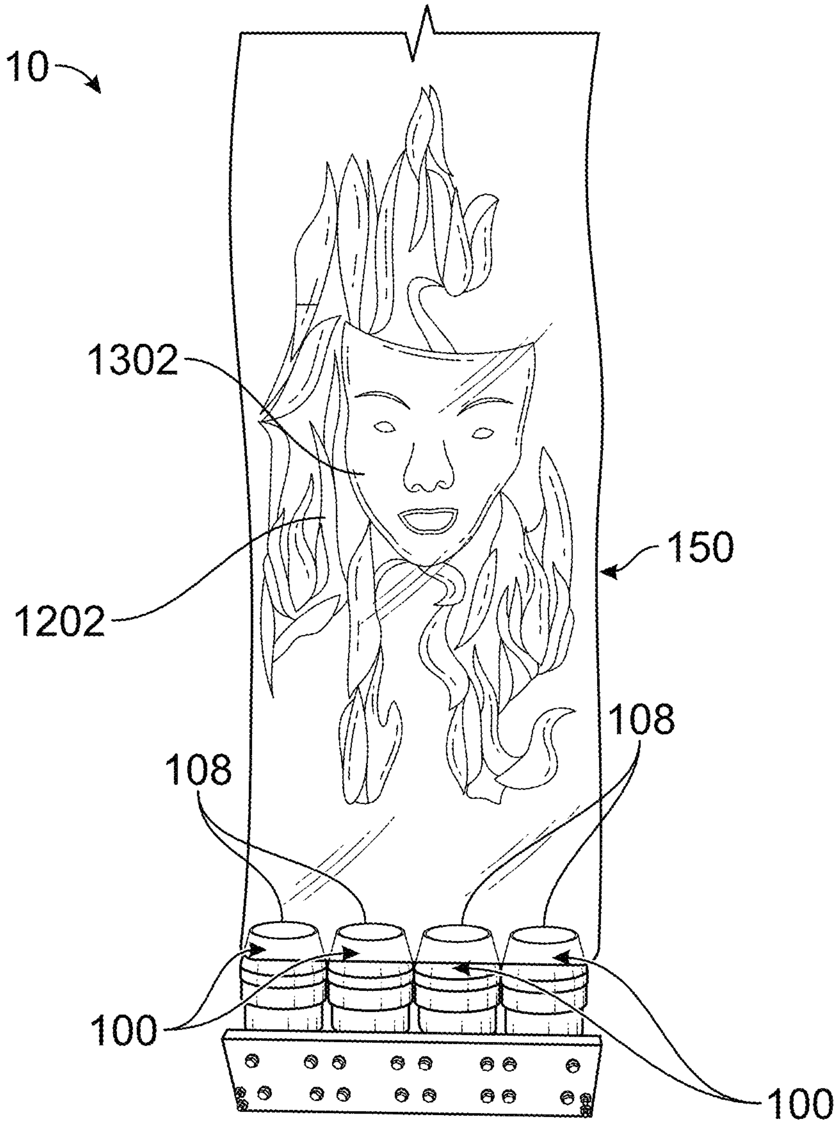
FIG. 13 depicts the fan effect system of FIG. 11 in a third position, according to an example embodiment.

FIGS. 11-13 depict a fan effect system 10 in a first position (FIG. 11), a second position (FIG. 12), and a third position (FIG. 13), according to an example embodiment. The fan effect system 10 includes a plurality of fan systems 100 positioned adjacent each other and coupled to the fabric material 150. As described herein, the nozzles 108 of the fan system 100 in such embodiments have an angled truncation to direct the airflow from the fans 104 to the fabric material 150 for deploying. In the first position, as shown in FIG. 11, the fan system 100 is powered and the fabric material 150 is extending upright. The fabric material 150 is substantially transparent and provides a surface (e.g., a hologram-like surface) for projection. The use of the plurality of fan systems 100 for the fabric material 150 provides a larger surface for projection, while maintaining the efficiency of deployment of the fabric material 150, as described herein.

As shown in FIGS. 12 and 13, the surface of the fabric material 150 for video projection allows for the fan effect system 10 to be used for dynamic effects, such as an appearance or a video of a character. FIGS. 12 and 13 show frames of a video projection projected onto the fabric material 150. In the second position of the fan effect system 10, shown in FIG. 12, the frame of the video from the video projection that is displayed on the fabric material 150 depicts flames 1202 and may be visualized by a user or a guest as a fire effect. In the third position of the fan effect system 10, shown in FIG. 13, the frame of the video from the video projection that is displayed on the fabric material 150 depicts a character 1302 appearing from the flames 1202 and provides a visual effect that is dynamic. Such visual effects may be used in a number of attractions or theatrics.

In some implementations, rather than the fan 104, a source of airflow may be utilized. For example, a source of compressed air, such as a compressed air container may be in communication with the fin blades 106 to provide an initial airflow to be modified by the fin blades 106 and communicated to the nozzle 108. In various embodiments, the nozzle 108 may be an air amplifier nozzle and the compressed air may be received by the air amplifier nozzle to output a larger volume of airflow for the fan effect. The fan 104 or the compressed air container may be coupled to nozzle 108 via a passage (e.g., a tube), such that the fan 104 or the compressed air container is positioned away from the nozzle 108. In such embodiments, the passage is used to direct airflow from the fan 104 or the compressed air container to the nozzle 108. As an example, the entire system may be disposable within an entertainer's costume.

Advantageously, the configuration of the fan effect system with the fan and the fabric material allows for animation of the fabric material at greater distances and along a variety of positions/angles. The use of the fabric material with synthetic material and a transparent or translucent surface allows for a visual effect to be displayed on the fabric material using video projection or a lighting system to create more realistic visual effects.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A fan effect system, comprising:

a fan system comprising a fan in communication with a plurality of fin blades, the plurality of fin blades partially disposed within the fan to receive a fan airflow from the fan, and a nozzle coupled to the plurality of fin blades at a position opposite the fan, the nozzle including an opening; and a fabric material comprising a translucent or transparent surface, the fabric material coupled to the nozzle;

wherein air flows from the fan through the plurality of fin blades and is directed by the opening of the nozzle to both sides of the fabric material to cause the fabric material to oscillate.

2. The fan effect system of claim 1, wherein the fan is a brushless fan outputting a maximum airflow of 200 cubic feet per minute at a wind speed of up to 60 meters per second.

3. The fan effect system of claim 1, wherein the nozzle has a frustoconical shape and the opening has a circular shape.

4. A fan effect system, comprising:

a fan system comprising a fan in communication with a plurality of fin blades partially disposed to receive a fan airflow from the fan, and a nozzle coupled to the plurality of fin blades opposite the fan, the nozzle including an opening; and a fabric material comprising a translucent or transparent surface, the fabric material coupled to the nozzle, wherein:

air flows from the fan through the plurality of fin blades and is directed by the opening of the nozzle to both sides of the fabric material to cause the fabric material to oscillate;

the nozzle has a frustoconical shape with an angled truncation, the nozzle including a high portion and a low portion, the high portion having a greater height from a base of the nozzle than the low portion; and the fabric material is coupled to the nozzle at the high portion.

5. The fan effect system of claim 1, further comprising a plurality of fan systems positioned adjacent each other, the plurality of fan systems including the fan system;

wherein the fabric material is coupled to a nozzle of each of the plurality of fan systems.

6. The fan effect system of claim 1, wherein a portion of the fan effect system is configured to couple to a user of the fan effect system.

7. The fan effect system of claim 1, wherein the fabric material includes heat sealed edges.

8. The fan effect system of claim 1, wherein an angle in which the fan system is configured to deploy the fabric material is adjustable.

9. The fan effect system of claim 1, wherein the fabric material is configured to display a visual effect with an interaction of light as the fabric material oscillates.

10. The fan effect system of claim 9, wherein the visual effect is one of an image or video from a projection system or laser light from a lighting system.

11. The fan system of claim 10, wherein the lighting system is coupled to the fan system.

12. The fan effect system of claim 1, further comprising a control unit communicatively coupled to the fan system, the control unit configured to control a speed of the fan to control the oscillations of the fabric material.

13. A fan effect system, comprising:

a fan system comprising a fan and a nozzle, the nozzle configured to direct air from the fan out of the fan system;

a fabric material comprising a translucent or transparent surface, the fabric material coupled to the nozzle, the fan system to generate airflow directed to both sides of the fabric material to cause the fabric material to oscillate while the fan system is generating airflow; and a control unit including one or more processors communicably coupled to memory, the control unit communicatively coupled to the fan system and configured to control a speed of the fan to control the oscillations of the fabric material.

14. The fan effect system of claim 13, wherein the control unit is configured to receive an input from a user and process the input to control the speed of the fan.

15. The fan effect system of claim 14, wherein the input comprises a sequence of speeds for the fan.

16. The fan effect system of claim 13, further comprising a plurality of fan systems positioned adjacent each other, the plurality of fan systems including the fan system;

wherein the fabric material is coupled to a portion of each of the plurality of fan systems.

17. The fan effect system of claim 13, wherein an angle in which the fan system is configured to deploy the fabric material is adjustable.

18. A fan system for a fan effect system, comprising:

a fan;

a plurality of fin blades partially disposed within the fan and in communication with the fan;

a fan grate coupled to a bottom of the fan; and a nozzle coupled to the plurality of fin blades at a position opposite the fan, the nozzle including an opening, air to flow from the fan through the plurality of fin blades and out of the fan system by the opening of the nozzle;

wherein a portion of the fan system is configured to couple to a fabric material manufactured from a synthetic material, the nozzle to direct the air to both sides of the fabric material to cause the fabric material to oscillate.

19. The fan system of claim 18, wherein the fan system is communicatively coupled to a control unit configured to control a speed of the fan to control oscillations of the fabric material.

20. The fan system of claim 18, wherein the plurality of fin blades are configured to modify airflow from the fan.

* * * * *